United States Patent Office 3,395,151
Patented July 30, 1968

3,395,151
ACRIDANYL AMINOCYCLOPROPANES
Carl Kaiser, Haddon Heights, N.J., and Charles L. Zirkle, Berwyn, Pa., assignors to Smith Kline & French Laboratories, Philadelphia, Pa., a corporation of Pennsylvania
No Drawing. Filed July 23, 1965, Ser. No. 474,449
7 Claims. (Cl. 260—279)

ABSTRACT OF THE DISCLOSURE

Acridanyl aminocyclopropane derivatives wherein the acridan ring may be substituted at positions 1, 2, 3 or 4 by chlorine, bromine, trifluoromethyl, methyl, methoxy or methylthio and at position 5 by lower alkyl, and the amino group may be primary, secondary or tertiary including cyclic amino, have antidepressant activity. The compounds are generally prepared via cyclopropanecarboxylic acid derivatives.

---

This invention relates to novel acridanyl aminocyclopropane derivatives having useful pharmacodynamic activity. More specifically, the compounds of this invention have antidepressant activity as measured by their ability to prevent reserpine-induced ptosis in rats. This experimental pharmacological property is used to characterize such known antidepressant agents as imipramine. Exemplary of the activity shown by the compounds of this invention in this standard pharmacological procedure is the prevention of ptosis in rats or oral dosages of 5–50 mg./kg.

The novel acridanyl aminocyclopropanes of this invention may be represented by the following general structural formula:

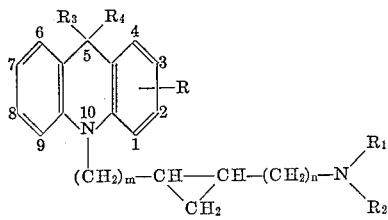

Formula I in which:

R represents hydrogen, chlorine, bromine, trifluoromethyl, methyl, methoxy or methylthio, preferably in the 2-position of the acridan ring;
$m$ and $n$ each represent an integer from 0 to 1;
$R_1$ and $R_2$ each represent hydrogen, lower alkyl of from 1 to 3 carbon atoms or when taken together with the nitrogen atom to which they are attached, represent a pyrrolidine, piperidine, N'-methylpiperazine, N'-($\beta$-hydroxyethyl) - piperazine or N' - ($\beta$-acetoxyethyl)-piperazine ring; and
$R_3$ and $R_4$ each represent hydrogen or lower alkyl such as methyl or ethyl.

Preferred compounds of this invention are represented by the above Formula I when $m$ is 0 and $n$ is 1.

The nontoxic pharmaceutically acceptable acid addition salts of the compounds of Formula I are also included within the scope of this invention. Both organic and inorganic acids can be employed to form such salts, illustrative acids being sulfuric, nitric, phosphoric, hydrochloric, citric, acetic, lactic, tartaric, pamoic, ethanedisulfonic, sulfamic, succinic, cyclohexylsulfamic, fumaric, maleic, benzoic and the like. These salts are readily prepared by methods known to the art.

The compounds of this invention may be present as cis-trans isomers due to the geometrical arrangement of the acridan substituent and the amino moiety with respect to the cyclopropane ring and further as $d$, $l$ optical isomers. Unless otherwise specified in the description and accompanying claims, it is intended to include all isomers, whether separated or mixtures thereof.

The novel acridanyl aminocyclopropanes of this invention are prepared by several methods, the choice of which depending on the definitions of $m$, $n$, $R_1$ and $R_2$. The starting materials for these methods are generally acridans having the formula:

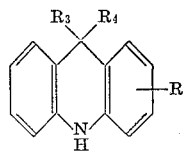

Formula II in which R, $R_3$ and $R_4$ are as defined in Formula I. These compounds are known or are prepared by methods known to the art.

In one method of preparation of the aminocyclopropanes of this invention, an acridan of Formula II is alkylated with, for example, ethyl 2-bromo- or 2-bromomethylcyclopropanecarboxylate followed by hydrolysis to give the corresponding cyclopropanecarboxylic acids having the formula:

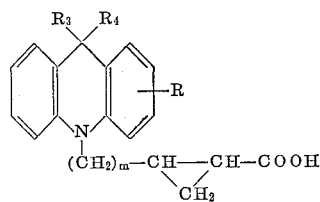

Formula III in which R, $R_3$ and $R_4$ are as defined in Formula I and $m$ is 0 or 1. The useful compounds of Formula III are converted to amino compounds of this invention by several routes. Reaction of the acid with a lower alkyl haloformate gives the corresponding cyclopropyl mixed anhydride which is then treated with sodium azide to give the cyclopropyl azide. The acid azide is then thermally decomposed by heating in an inert organic solvent to give the corresponding isocyanate. The resulting isoyanate is converted to aminocyclopropanes of Formula I where $n$ is 0 by: (a) hydrolysis with a mineral acid such as hydrochloric acid or an alkali metal hydroxide such as sodium or potassium hydroxide at elevated temperatures to give the primary aminocyclopropane or (b) reaction with a lower alkyl magnesium halide or lower alkanol to give an N-lower acyl or N-lower carbalkoxy aminocyclopropane, respectively, which is either reduced directly with, for example, lithium aluminum hydride to give an N-lower aminocyclopropane or further reacted with a lower alkyl iodide to give an N-lower alkyl-N-lower acyl or N-lower alkyl-N-lower carbalkoxy aminocyclopropane, respectively, which is reduced with, for example, lithium aluminum hydride to give an N,N-dialkylaminocyclopropane.

To prepare the aminocyclopropanes of Formula I where $m$ is 0 and $n$ is 1, an acridan of Formula II is advantageously alkylated with 2-bromocyclopropanecarboxamide to form the carboxamide derivative which is reduced with, for example, lithium aluminum hydride to give the corresponding aminomethylcyclopropanes as follows:

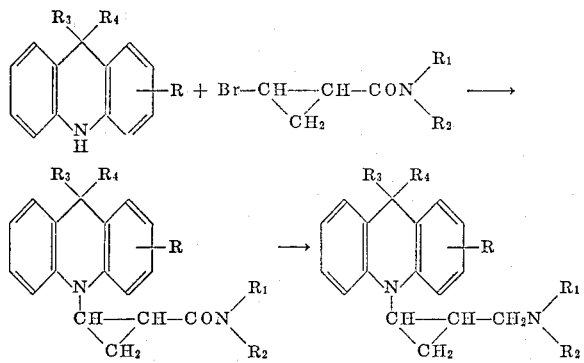

in which R, $R_3$ and $R_4$ are as defined in Formula I, $R_1$ is hydrogen or lower alkyl, and $R_2$ is lower alkyl or when $R_1$ and $R_2$ are taken together with the nitrogen atom to which they are attached, represent a pyrrolidine, piperidine or N'-methylpiperazine ring. The 2-bromocyclopropanecarboxamides are readily prepared from the corresponding carboxylic esters by hydrolysis, conversion to the acid chloride, and treatment with a secondary amine.

Alternatively, the aminocyclopropanes of Formula I where $n$ is 1 are prepared from the cyclopropanecarboxylic acids of Formula III by reacting the acid with a lower alkyl haloformate to give the corresponding cyclopropyl mixed anhydride which is then treated with ammonia, a monoalkyl amine, a dialkylamine or a heterocyclic amine to give the cyclopropanecarboxamide. Reduction of the amide with, for example, lithium aluminum hydride gives the corresponding aminomethylcyclopropanes.

The novel aminocyclopropanes of this invention represent by Formula I above where $m$ and $n$ are 1 are prepared by alkylation of the acridans of Formula II with an active ester derivative of aminocyclopropyl carbinols, for example, a p-toluenesulfonate derivative. These useful carbinol intermediates having the formula:

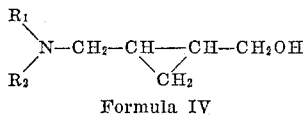

Formula IV in which $R_1$ and $R_2$ are lower alkyl or when taken together with the nitrogen atom to which they are attached, represent a pyrrolidine, piperidine or N'-methylpiperazine ring are prepared by reaction of, for example, ethyl α-bromocrotonate with an appropriate dialkylamine or heterocyclic amine to give the corresponding aminocrotonate which is then reacted with a reagent formed from trimethylsulfoxonium iodide. The latter in the presence of a strong base such as sodium hydride forms a reactive substance called dimethylsulfoxonium methylide,

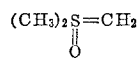

which produces the ethyl aminocyclopropylcarboxylate. Similar reduction of the carboxylate with, for example, lithium aluminum hydride gives the aminocyclopropyl carbinols of Formula IV where $n$ is 1.

The aminocyclopropyl carbinols of Formula IV above are advantageously employed in the acridan alkylation as the tosylates. Thus, reaction of the aminomethylcyclopropyl carbinol tosylate with the appropriate acridan gives the desired product.

The compounds of Formula I above where $R_1$ and $R_2$ together represent a heterocyclic amino moiety are prepared also from the corresponding primary amines. The pyrrolidinyl and piperidinyl derivatives are prepared from the primary amine and 1,4-dibromobutane and 1,5-dibromopentane, respectively, in an organic solvent refluxing at a temperature from 100–150° C. and in the presence of potassium carbonate. Similar reaction of the primary amine with methyl bis-(β-chloroethyl)-amine gives the N'-methylpiperazinyl derivative.

In the above described preparation methods, when the first step of the reaction sequence consists of alkylation of an acridan with an ethyl 2-bromomethylcyclopropanecarboxylate or a carbinol intermediate of Formula IV, both the cis and trans products are obtained depending on the stereochemistry of the alkylating agent. However, when an ethyl 2-bromocyclopropanecarboxylate or a 2-bromocyclopropanecarboxamide is employed, the more stable trans products are obtained.

To prepare the cis as well as trans acridanyl aminocyclopropane derivatives of Formula I in which $m$ is 0 and $n$ is 1 an appropriate 10-vinylacridan is reacted with ethyl diazoacetate to give a mixture of cis- and trans-acridanyl cyclopropanecarboxylates. This mixture is selectively hydrolyzed with alkali to give the trans-acid and unhydrolyzed cis-ester. Subsequent hydrolysis of the cis-ester with excess alkali affords the cis-acid. Both isomeric acids are thus available for further reaction as described hereinabove. The 10-vinylacridans are conveniently prepared via Hofmann degradation of corresponding 10-dimethylaminomethyl-acridan methiodides.

The novel compounds of this invention may be administered orally or parenterally in conventional dosage forms such as tablets, capsules, injectables or the like, by incorporating the appropriate dose of a compound of Formula I with carriers according to accepted pharmaceutical practices.

The foregoing is a general description of the main synthetic routes in the preparation of the aminocyclopropanes of this invention. It will be readily apparent to one skilled in the art that variations of these procedures are possible. The following examples illustrate these procedures but should not be construed as limiting the invention to the specific compounds prepared thereby. Where the examples specify reaction of a trans compound, the corresponding cis isomer can of course be similarly employed.

Example 1

To a stirred solution of 3.7 g. of acridan in 50 ml. of dimethylsulfoxide is added, in portions, 0.95 g. of 52% dispersion of sodium hydride in mineral oil. The mixture is heated at 60–70° C. for 20 minutes, then cooled to 20° C. and a solution of 4.0 g. of 2-bromo-N,N-dimethylcyclopropanecarboxamide in 20 ml. of dimethylsulfoxide is added dropwise. The resulting mixture is heated at 100° C. for one hour, cooled, diluted with 500 ml. of ice-water and extracted with ether. The extract is dried and concentrated to give trans-2-(10-acridanyl)-N,N-dimethylcarboxamidocyclopropane.

A solution of this amide in 50 ml. of dry ether is added dropwise to a stirred suspension of 1.6 g. of lithium aluminum hydride in 150 ml. of ether. The mixture is stirred and refluxed for four hours. To the cooled reaction mixture is added dropwise 1.6 ml. of water followed by 1.6 ml. of 10% aqueous sodium hydroxide and an additional 4.8 ml. of water. The resulting mixture is filtered and the filtrate extracted with aqueous acetic acid. The acid extract is made alkaline with dilute sodium hydroxide solution and the mixture extracted with ether. The dried ether extract is concentrated to give trans-2-(10-acridanyl)-N,N-dimethylaminomethylcyclopropane. Treatment of the free base with ethereal hydrogen chloride gives the hydrochloride salt, M.P. 230° C. (dec.).

Similarly, by employing in the above reaction sequence 3.9 g. of 2-methylacridan there is obtained as the final product trans-2-[10-(2-methylacridanyl)]-N,N-dimethylaminomethylcyclopropane.

Example 2

To a stirred mixture of 108 g. of 2-chloroacridan in 500 ml. of dry toluene is added, under nitrogen, 21.5 g. of sodium amide. The mixture is stirred and refluxed for two hours, the heat is removed and a solution of dimethylaminoethyl chloride in toluene is added dropwise. The latter is prepared by dissolving 144 g. of dimethylaminoethyl chloride hydrochloride in a minimum volume of water, adding with cooling excess 40% sodium hydroxide solution, saturating the mixture with sodium carbonate and extracting with toluene.

The reaction mixture is stirred and refluxed for two hours, cooled and then treated with 25 ml. of ethanol followed by 250 ml. of water, the latter added slowly. The separated organic layer is dried and concentrated in vacuo. The residue is distilled to give 2-chloro-10-(2-dimethylaminoethyl)-acridan.

To a stirred solution of 118 g. of the above acridan in 1.2 l. of acetone is added dropwise a solution of 71 g. of methyl iodide in 200 ml. of acetone. The reaction mixture is stirred at room temperature for one hour and then filtered to give the corresponding methiodide.

A suspension of anion exchange resin (hydroxide form) is washed several times with methanol, then suspended in 500 ml. of methanol and 69 g. of the above acridan methiodide suspended in 150 ml. of methanol is added. The mixture is stirred at room temperature for one hour, filtered and the resin cake is washed with methanol. The filtrates are concentrated in vacuo and the residue (the corresponding acridan methyl hydroxide) is heated on a steam bath in vacuo until gas evolution is complete. The residue is taken up into ether and the solvent removed in vacuo to give 2-chloro-10-vinylacridan.

To a refluxing mixture of 2 g. of anhydrous cupric sulfate powder and 100 ml. of dry benzene is added, dropwise with stirring, a solution of 44 g. of the above 10-vinylacridan and 27.4 g. of ethyl diazoacetate in 150 ml. of dry benzene. After addition is complete, the mixture is refluxed for 30 minutes, filtered and the filtrate concentrated in vacuo to give the residual ethyl 2-[10-(2-chloroacridanyl)]-cyclopropanecarboxylate.

To a stirred solution of the above cyclopropanecarboxylate (0.1 mole) in 200 ml. of ethanol at 0° C. is added a solution of 3.9 g. (0.07 mole) of potassium hydroxide in 20 ml. of water. The mixture is stirred at room temperature for one hour then it is refluxed for two hours and concentrated in vacuo. The residue is diluted with water and extracted with ether. This ether solution contains the cis-ester. The aqueous layer is acidified with acetic acid (pH 6) and extracted with ether. The ether extract is dried and concentrated in vacuo to give, after crystallization from ethyl acetate-hexane, trans-2-[10-(2-chloroacridanyl)]-cyclopropanecarboxylic acid.

The above ether solution of cis-ester is dried and concentrated. The residual oily ester is hydrolyzed with excess aqueous-ethanolic potassium hydroxide in an analogous manner to give cis-2-[10-(2-chloroacridanyl)]-cyclopropanecarboxylic acid.

To a solution of 5.8 g. of the above trans-cyclopropanecarboxylic acid in 60 ml. of acetone, cooled to 0° C. is added 4.7 ml. of triethylamine in acetone and 3.2 ml. of ethyl chloroformate. The mixture is stirred for 15 minutes and then a solution of 2.6 g. of sodium azide in water is added. After stirring for 30 minutes, the reaction mixture is poured into ice-water and extracted with toluene. The dried extract is heated on the steam bath to decompose the acid azide. Removal of the solvent gives the residual trans-cyclopropyl isocyanate derivative.

To a stirred mixture of 50 ml. of 3 M methyl magnesium bromide in ether is added 6.7 g. of the above isocyanate in ether. The mixture is refluxed for two hours, cooled and 200 ml. of 10% hydrochloric acid solution is added slowly. The separated aqueous layer is extracted with ether. Concentration of the organic solutions gives the trans-2-[10-(2-chloroacridanyl)]N-acetylaminocyclopropane.

To a solution of 7.0 g. of the above N-acetylaminocyclopropyl derivative in 70 ml. of tetrahydrofuran is added 1.0 g. 53.5% sodium hydride and the mixture is stirred and refluxed for one hour. A solution of 8 ml. of ethyl iodide in 25 ml. of tetrahydrofuran is added to the cooled reaction mixture which is then refluxed for four hours. An additional 8 ml. of ethyl iodide in 10 ml. of tetrahydrofuran is added and refluxing continued for 12 hours. The reaction mixture is filtered and the filtrate concentrated in vacuo. The residue is taken up in water and ether, extracted with ether and the dried solvent removed to give trans-2 - [10-(2-chloroacridanyl)] - (N-acetyl-N-ethylamino)-cyclopropane.

A solution of the above N-acetyl-N-ethylaminocyclopropyl derivative (7.5 g.) in ether is added to a suspension of 5.0 g. of lithium aluminum hydride in ether and the mixture stirred and refluxed for six hours. Decomposition of the metal complex yields an oil which is treated in acetone solution with ethereal hydrogen chloride to give trans-2 - [10-(2-chloroacridanyl)] - N,N - diethylaminocyclopropane hydrochloride.

Direct hydrolysis of the above trans-cyclopropyl isocyanate yields trans-2-[10-(2-chloroacridyanyl)]-aminocyclopropane.

Example 3

To a solution of 6.3 g. of 2-trifluoromethylacridan in 20 ml. of dimethylsulfoxide is added in portions 1.2 g. of a 53.5% suspension of sodium hydride in mineral oil, maintaining the temperature below 40° C. A solution of 4.8 g. of ethyl 2-bromocyclopropanecarboxylate in 10 ml. of dimethylsulfoxide is added dropwise and the mixture is heated on the steam bath for one hour. The reaction mixture is poured onto ice/water mixture and extracted with ether. The dried extract is concentrated to give ethyl 2-[10 - (2 - trifluoromethylacridanyl)] - cyclopropanecarboxylate.

A mixture of 8.2 g. of the above carboxylate derivative in 100 ml. of ethanol and 2.6 g. of potassium hydroxide in water is stirred and refluxed for two hours. The alcohol is replaced by water using a trap and the filtered aqueous solution is extracted with ether. Acidification with concentrated hydrochloric acid gives a solid which is taken up in ethyl acetate. This solution if dried and evaporated to give an oil which is crystallized from ethyl acetate-petroleum ether to give trans-2-[10-(2-trifluoromethylacridanyl)]-cyclopropanecarboxylic acid.

To a mixture of 3.7 g. of the above trans carboxylic acid and 3 ml. of triethylamine, cooled to 0° C., is added 2 ml. of ethyl chloroformate in acetone. The mixture is stirred for 15 minutes and then 4.4 g. of N-(β-hydroxyethyl)piperazine in acetone is added with cooling. After stirring for three hours at room temperature, the reaction mixture is poured into cold water and extracted with ether. The dried extract is evaporated to give trans-2-[10-(2-trifluoromethylacridanyl)] - N - [N' - (β-hydroxyethyl)]-piperazinoylcyclopropane.

To a suspension of 1.0 g. of lithium aluminum hydride in ether is added a suspension of 3.7 g. of the above piperazinoyl derivative in ether and the mixture stirred and refluxed for eight hours. After standing overnight at room temperature, the reaction mixture is decomposed, filtered and the filtrate acidified with ethanol-ethereal hydrogen chloride. Addition of excess ether precipitates the solid trans-2 - [10-(2-trifluoromethylacridanyl)] - N-[N'-(β-hydroxyethyl)] - piperazinylmethylcyclopropane hydrochloride. Acetylation with acetyl chloride yields the corresponding β-acetoxyethyl derivative.

Example 4

A solution of 9.3 g. of trans-2-[10-(2-trifluoromethylacridanyl)]-cyclopropanecarboxylic acid (prepared as in Example 3) in acetone is treated with 7 ml. of triethylamine in acetone. The resulting mixture is cooled to 0° C. and 5 ml. of ethyl chloroformate in acetone is added. After stirring for 20 minutes, a solution of 7.1 g. of dimethylamine in acetone is added and stirring continued for 30 minutes with cooling and then for two hours at room temperature. The reaction mixture is poured into ice-water, extracted with methylene chloride and the dried extract evaporated. The residue is taken up in ether, extracted with 10% sodium hydroxide solution and the dried ether solution evaporated to give the solid trans-2-[10-(2-trifluoromethylacridanyl)]-N,N-dimethylcarboxamidocyclopropane.

To 2.5 g. of lithium aluminum hydride in ether is added a solution of 9.3 g. of the above carboxamido derivative in ether and the mixture is stirred and refluxed for eight hours. After standing at room temperature overnight, the reaction mixture is decomposed, filtered and the filtrate evaporated. The residue is taken up in ethanol and treated with ethereal hydrogen chloride. Addition of excess ether precipitates the solid trans-2-[10-(2-trifluoromethylacridanyl)]-N,N-dimethylaminomethylcyclopropane hydrochloride.

Similarly, by employing 11 g. of pyrrolidine instead of dimethylamine in the above reaction sequence with subsequent reduction by 2.5 g. of lithium aluminum hydride there is obtained trans-2-[10-(2-trifluoromethylacridanyl)]-N-pyrrolidinylmethylcyclopropane.

Example 5

To a stirred solution of 49.6 g. of piperidine in 170 ml. of dry benzene is added dropwise during ten minutes, 56.1 g. of ethyl 4-bromocrotonate. The mixture is stirred and refluxed for one hour, cooled and filtered. After washing the filter cake with ether, the combined organic filtrates are washed with water, dried and concentrated to give ethyl 4-(N-piperidinyl)-crotonate, B.P. 95–99° C./0.4 mm.

To a stirred suspension of 102.5 g. of trimethylsulfoxonium iodide in 500 ml. of dimethylsulfoxide is added in portions, maintaining the temperature below 35° C., 13.0 g. of sodium hydride (53.5% suspension in mineral oil). After hydrogen evolution is completed, 31.6 g. of ethyl 4-(N-piperidinyl)-crotonate is added dropwise at 25° C. The mixture is stirred at 25° C. for one hour, at 60° C. for two hours, then poured into 2 l. of ice-water and extracted with ether. The ether solution is extracted with 5% hydrochloric acid solution and the acid extract made alkaline with sodium hydroxide solution. This mixture is extracted with ether, the extract dried and concentrated in vacuo to give ethyl trans-2-(N-piperidinylmethyl)-cyclopropanecarboxylate, B.P. 112–114.5° C./3.5 mm.

A solution of 21.1 g. of the above carboxylate in 100 ml. of ether is added dropwise to a stirred suspension of 3.8 g. of lithium aluminum hydride in 300 ml. of dry ether and the mixture is refluxed for 30 minutes. Then is added successively, 4 ml. of water, 4 ml. of 10% aqueous sodium hydroxide and 12 ml. of water. The mixture is filtered and the filter cake is washed thoroughly with methylene chloride. The combined organic filtrates are dried and concentrated to give 2-hydroxymethyl-1-(N-piperidinylmethyl)-cyclopropane.

To a suspension of 4.5 g. of sodium hydride (53.5% suspension in mineral oil) in 100 ml. of dry tetrahydrofuran is added dropwise 16.9 g. of the above cyclopropane in 30 ml. of tetrahydrofuran. The mixture is stirred at 25° C. The reaction mixture is filtered to give a solution of 2-hydroxymethyl-1-(N-piperidinylmethyl)-cyclopropane, p-toluenesulfonate in tetrahydrofuran which may be used directly in the following alkylation step or isolated as a p-toluenesulfonate salt by treatment of the tetrahydrofuran solution with p-toluenesulfonic acid, concentration and recrystallization of the residue.

A solution of 20.9 g. of 5,5-dimethylacridan in 100 ml. of dimethylsulfoxide is added slowly to a suspension of 4.5 g. of sodium hydride (53.5% dispersion in mineral oil) in 100 ml. of dimethylsulfoxide at 20–25° C. After hydrogen evolution is completed, a solution of 32.3 g. of 2-hydroxymethyl-1-(N-piperidinylmethyl)-cyclopropane, p-toluenesulfonate in 160 ml. of tetrahydrofuran is added dropwise. The mixture is stirred and refluxed for one hour, poured into 1 l. of ice-water and extracted with ether. The extract is washed with water, dried and concentrated to give trans-2-[10-(5,5-dimethylacridanyl)-methyl]-N-piperidinylmethylcyclopropane.

Example 6

To a suspension of 4 g. of lithium aluminum hydride in ether is added a solution of 9.2 g. of trans-2-[10-(-2-chloroacridanyl)]-N-acetylaminocyclopropane (prepared as described in Example 2) in ether and the mixture stirred and refluxed for eight hours. The reaction mixture is decomposed, filtered and the filtrate evaporated to give trans-2-[10-(2-chloroacridanyl)]-N-monoethylaminocyclopropane.

Example 7

To a solution of 5.7 g. of cis-2-[10-(2-chloroacridanyl)]-cyclopropanecarboxylic acid (prepared as in Example 2) in 60 ml. of acetone, cooled to 0° C. is added 4.7 ml. of triethylamine in acetone and 3.2 ml. of ethyl chloroformate. The mixture is stirred for 15 minutes and then a solution of 2.6 g. of sodium azide in water is added. After stirring for 30 minutes, the reaction mixture is poured into ice-water and extracted with toluene. The dried extract is heated on the steam bath to decompose the acid azide. Removal of the solvent gives the corresponding cyclopropyl isocyanate derivative.

The above isocyanate is suspended in a large volume of 20% aqueous hydrochloric acid and the mixture is refluxed and stirred for four hours. The resulting solution is made basic and extracted with ether. Evaporation of the ether extract gives cis-2-[10-(2-chloroacridanyl)]-aminocyclopropane.

Example 8

To a solution of 25.1 g. of 5-methyl-2-trifluoromethylacridan in 300 ml. of dry toluene is added 4.6 g. of sodium hydride (53.5% dispersion in mineral oil). The mixture is stirred and refluxed for one hour, then it is cooled to 25° and a solution of 20.7 g. of ethyl trans-2-bromomethylcyclopropane-carboxylate in 50 ml. of toluene is added dropwise. The mixture is stirred and refluxed for 8 hours, cooled and diluted with water. Concentration of the dried toluene solution affords ethyl trans-2-[10-(5-methyl-2-trifluoromethylacridanyl)-methyl]-cyclopropanecarboxylate.

To a solution of the above ester (21.9 g.) in 250 ml. of ethanol is added a solution of 5.6 g. of potassium hydroxide in 10 ml. of water. The solution is heated under reflux for two hours, concentrated and diluted with water. After extraction of the mixture with ether the aqueous solution is acidified to give trans-2-[10-(5-methyl-2-trifluoromethylacridanyl)-methyl]-cyclopropanecarboxylic acid.

To a solution of 7.6 g. of the above carboxylic acid in 80 ml. of acetone at 0° C. is added 4.7 ml. of triethylamine in acetone and then 3.2 ml. of ethyl chloroformate. The mixture is stirred for 15 minutes and then a solution of 2.6 g. of sodium azide in water is added. After stirring for 30 minutes, the reaction mixture is poured into ice-water and extracted with toluene. The dried extract is cautiously heated on the steam bath. After nitrogen evolution is completed the solution is concentrated in vacuo to give the trans-cyclopropyl isocyanate derivative.

The above isocyanate is diluted with 50 ml. of ethanol, the solution is refluxed for two hours and concentrated in vacuo to afford an oily carbamate. This carbamate (4.4 g.) is dissolved in 60 ml. of dimethylsulfoxide and 0.46 g. of sodium hydride (53.5% dispersion in mineral oil) is added. The mixture is stirred at 40° C. until hydrogen evolution is completed, then 5 ml. of methyl iodide is added and the mixture is stirred at 50° C. for two hours. The mixture is diluted with ice-water and extracted with ether. The ether extracts are dried and concentrated to give the N-methylcarbamate derivative.

A solution of the above N-methylcarbamate (4.6 g.) in ether is added to a suspension of 2.0 g. of lithium aluminum hydride in ether and the mixture is stirred and refluxed for two hours. Decomposition of the metal complex gives an oil which is treated in ethanol solution with ethereal hydrogen chloride to give trans-2-[10-(5-methyl-2-trifluoromethylacridanyl) - methyl] - N,N - dimethylaminocyclopropane hydrochloride.

Similarly, 2-methylthioacridan yields trans-2-[10-(2-methylthioacridanyl) - methyl] - N,N - dimethylaminocyclopropane.

Example 9

To a solution of 57 g. of 2-chloroacridan in 200 ml. of dimethylsulfoxide is added 13 g. of 55.6% sodium hydride in portions, with cooling, and the mixture is stirred for 15 minutes. A solution of 57 g. of ethyl 2-bromocyclopropanecarboxylate in 190 ml. of dimethylsulfoxide is added and the mixture is stirred at room temperature for 45 minutes. After subsequent heating on the steam bath for 30 minutes, the reaction mixture is poured into 2 liters of ice-water, extracted with ether and the dried extract evaporated to give ethyl 2-[10-(2-chloroacridanyl)]-cyclopropanecarboxylate.

A mixture of 78 g. of the above carboxylate in 800 ml. of ethanol and 27 g. of potassium hydroxide in water is stirred and refluxed for one hour. After standing at room temperature overnight, the reaction mixture is concentrated in vacuo, diluted with 1 l. of water extracted with ether. Acidification with concentrated hydrochloric acid solution gives a solid which is trans-2-[10-(2-chloroacridanyl)]-cyclopropanecarboxylic acid, identical with that prepared by the method of Example 2.

Similarly, employing ethyl 2 - bromomethylcyclopropanecarboxylate in the above reaction sequence yields trans-2-[10 - (2-chloroacridanyl) - methyl]-cyclopropanecarboxylic acid.

To a suspension of 23.7 g. of the above trans-2-[10-(2-chloroacridanyl)]-cyclopropanecarboxylic acid in 200 ml. of acetone is added 19 ml. of triethylamine in acetone. The mixture is cooled to —5° C., 14 ml. of ethyl chloroformate in acetone is added and stirred for 30 minutes. A solution of 16 g. of dimethylamine in 80 ml. of acetone is added over 45 minutes, maintaining the temperature below 0° C. After 30 minutes the reaction mixture is stirred at room temperature for one hour, then 15 minutes at 40° C. and poured into ice-water. The mixture is extracted with methylene chloride and the dried extract evaporated to give trans-2-[10-(2-chloroacridanyl)]-N,N-dimethylcarboxamidocyclopropane.

A solution of 29.1 g. of the above carboxamido derivative in 225 ml. of ether is added to a suspension of 8 g. of lithium aluminum hydride in ether and the mixture refluxed for five and one-half hours. The reaction mixture is decomposed, filtered and the filtrate evaporated to give a solid which is dissolved in acetone. Ethereal hydrogen chloride is added to the acetone solution to yield trans - 2[10-(2-chloroacridanyl)] - N,N-dimethylaminomethylcyclopropane hydrochloride.

Similarly, by employing 33 g. of N-methylpiperazine instead of dimethylamine in the above reaction sequence, the corresponding trans-2 - [10-(2-chloroacridanyl)]-N-(N'-methyl)-piperazinylmethylcyclopropane is obtained.

Example 10

To a suspension of 10 g. of trans-2-[10-(2-chloroacridanyl)]-cyclopropanecarboxylic acid in 60 ml. of acetone is added 8 ml. of triethylamine in acetone, cooled to —5° C., 6 ml. of ethyl chloroformate in acetone is added and the mixture is stirred for 15 minutes in the cold. A solution of 4.4 g. of sodium azide in water is added, stirred for 30 minutes, poured into ice-water and extracted with toluene. The dried extract is heated until gas evolution ceases and then the solvent is removed to give the corresponding trans isocyanate derivative. The latter (12.2 g.) is dissolved in 60 ml. of ethanol and stirred and refluxed for two hours. Removal of the solvent in vacuo gives the ethyl carbamate derivative.

A solution of 11 g. of the above carbamate in 50 ml. of dimethylsulfoxide is added to a suspension of 1.4 g. of 55.6% sodium hydride (mineral oil) in 35 ml. of dimethylsulfoxide. The mixture is heated briefly, cooled to 20° C. and 7 ml. of methyl iodide is added, maintaining the temperature between 15–20° C. This mixture is heated at 55–60° C. for 30 minutes, poured into 250 ml. of ice-water, extracted with ether and the dried extract evaporated to give trans-2-[10-(2-chloroacridanyl)]-(N-methyl-N-carbethoxy)-aminocyclopropane.

To a suspension of 2.5 g. of lithium aluminum hydride in ether is added a solution of 11.1 g. of the above N-methyl carbamate derivative in ether and the mixture is refluxed for four hours. The reaction mixture is decomposed, filtered, and the ether removed to give trans-2-[10-(2-chloroacridanyl)]-N,N-dimethylaminocyclopropane.

Similarly, employing 2-chloro-5-ethyl-5-methyl-acridan in the above reaction sequence yields as the final product, trans-2 - [10-(2-chloro-5-ethyl-5-methylacridanyl)]-N,N-dimethylaminocyclopropane.

Example 11

To a suspension of 2.4 g. of 53.5% sodium hydride in 300 ml. of dimethylsulfoxide is added a solution of 13.1 g. of 2-bromoacridan in 50 ml. of dimethylsulfoxide. The mixture is stirred for 30 minutes at 90° C., cooled and 9.7 g. of ethyl 2-bromocyclopropanecarboxylate in 10 ml. of dimethylsulfoxide is added. After stirring for one hour at 90–95° C., the reaction mixture is poured into ice-water, extracted with ether and the dried ether extract evaporated to give ethyl 2-[10-(2-bromoacridanyl)]-cyclopropanecarboxylate.

A mixture of 11.5 g. of the above carboxylate in 100 ml. of ethanol and a solution of 5.6 g. of potassium hydroxide in water is stirred and refluxed for two hours. The solvent is removed in vacuo and the residue is taken up in 175 ml. of water, extracted with ether and the aqueous solution is acidified to give the solid trans-2-[10-(2-bromoacridanyl)]-cyclopropanecarboxylic acid.

To a suspension of 28 g. of the above acid derivative in 200 ml. of acetone is added 19 ml. of triethylamine in acetone. The mixture is cooled to —5° C., 14 ml. of ethyl chloroformate in acetone is added and stirred for 30 minutes. A solution of 16 g. of dimethylamine in 80 ml. of acetone is added over 45 minutes, maintaining the temperature below 0° C. After 30 minutes the reaction mixture is stirred at room temperature for one hour, then 15 minutes at 40° C. and poured into ice-water. The mixture is extracted with methylene chloride and the dried extract evaporated to give trans-2-[10-(2-bromoacridanyl)]-N,N-dimethylcarboxamidocyclopropane.

A solution of 35.2 g. of the above carboxamido derivative in 225 ml. of ether is added to a suspension of 8 g. of lithium aluminum hydride in ether and the mixture refluxed for six hours. The reaction mixture is decomposed, filtered and the filtrate evaporated to give trans-2-[10-(2-bromoacridanyl)]-N,N - dimethylaminomethylcyclopropane.

Similarly, by employing in the above reaction sequence 10.6 g. of 2-methoxyacridan there is obtained as a final product trans - 2 - [10-(2-methoxyacridanyl)]-N,N-dimethylaminomethylcyclopropane.

What is claimed is:

1. A chemical compound or its salts with pharmaceutically acceptable acids, said compound having the formula:

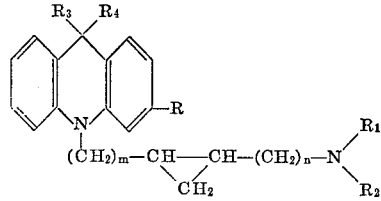

in which:

R is hydrogen, chlorine, bromine, trifluoromethyl, methyl, methoxy or methylthio;
each of m and n is an integer of from 0 to 1;
$R_1$ and $R_2$ are, when taken individually, hydrogen or lower alkyl of from 1 to 3 carbon atoms, and when taken together with the nitrogen atom to which they are attached, a pyrrolidine, piperidine, N'-methylpiperazine, N'-(β-hydroxyethyl)-piperazine or N'-(β-acetoxyethyl)-piperazine ring; and
$R_3$ and $R_4$ are each hydrogen, methyl or ethyl.

2. A chemical compound of the formula:

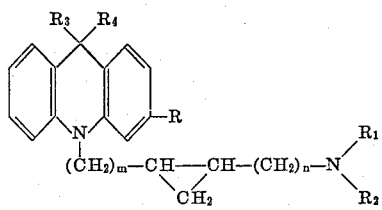

in which:

R is hydrogen, chlorine, bromine, trifluoromethyl, methyl, methoxy or methylthio;
each of m and n is an integer of from 0 to 1;
$R_1$ and $R_2$ are lower alkyl of from 1 to 3 carbon atoms; and
$R_3$ and $R_4$ are each hydrogen, methyl or ethyl.

3. A chemical compound of the formula:

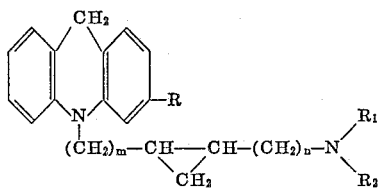

in which:

R is hydrogen, chlorine, bromine, trifluoromethyl, methyl, methoxy or methylthio;
each of m and n is an integer of from 0 to 1; and
$R_1$ and $R_2$ are lower alkyl of from 1 to 3 carbon atoms.

4. A chemical compound of the formula:

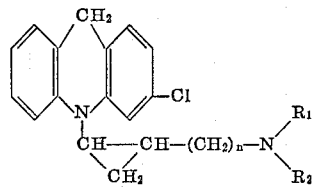

in which:

n is a positive integer of from 0 to 1; and
$R_1$ and $R_2$ are lower alkyl of from 1 to 3 carbon atoms.

5. A chemical compound of the formula:

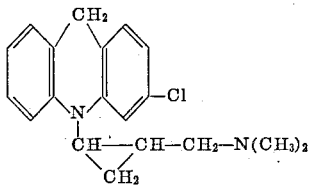

6. A chemical compound of the formula:

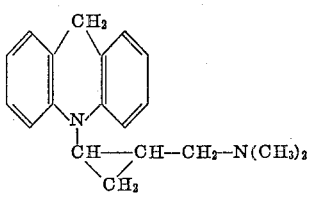

7. A chemical compound of the formula:

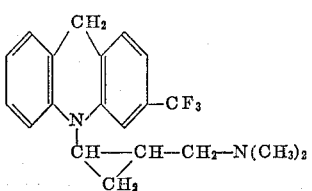

References Cited

UNITED STATES PATENTS

| | | | |
|---|---|---|---|
| 3,131,190 | 4/1964 | Zirkle | 260—279 |
| 2,629,719 | 2/1953 | Cusic | 260—293.44 X |
| 2,676,966 | 4/1954 | Cusic et al. | 260—279 |
| 3,033,866 | 5/1962 | Saggiomo et al. | 260—279 |
| 3,043,842 | 7/1962 | Craig | 260—279 X |
| 3,284,454 | 11/1966 | Haring et al. | 260—279 |

OTHER REFERENCES

Albert, The Acri Dines, Arnold, pp. 201-3 (1951).

NICHOLAS S. RIZZO, *Primary Examiner.*

D. DAUS, *Assistant Examiner.*